though in smaller quantities in each molecule. Mixtures of alkanols can be also used.

3,745,221
METHODS AND COMPOSITIONS FOR IMPROVING FEED EFFICIENCY OF RUMINANTS USING POLYHYDRIC ALKANOL HALOACETALDEHYDE HEMIACETALS

Roger C. Parish, King of Prussia, and John E. Trie, Malvern, Pa., assignors to Smith Kline & French Laboratories, Philadelphia, Pa.

No Drawing. Continuation-in-part of applications Ser. No. 881,868 and Ser. No. 881,915, both Dec. 3, 1969. This application Oct. 5, 1970, Ser. No. 78,188

Int. Cl. A61k 27/00; A23k 1/18

U.S. Cl. 424—342                              16 Claims

ABSTRACT OF THE DISCLOSURE

Polyhydric alkanol haloacetaldehyde hemiacetals are potent inhibitors of methanogenesis in the ruminant animal. Consequently these chemical agents improve the feed efficiency in ruminants at levels which do not have therapeutic or general antifermentation effects in the animal. The most useful and representative compound is pentaerythritol tetrachloral hemiacetal. Methods of administration, feed compositions and premixes containing said inhibitors are described.

---

This is a continuation-in-part application of our earlier but pending applications Ser. No. 881,868, filed Dec. 3, 1969 and Ser. No. 881,915, filed Dec. 3, 1969 now U.S. Pat. No. 3,615,649.

This invention relates to advantageous new methods and compositions for improving the feed efficiency in ruminant animals using specified polyhydric alkanol haloacetaldehyde hemiacetals as active ingredients. These methods and compositions use oral administration of effective but not noxious quantities of the active ingredients to inhibit methanogenesis in the rumen itself. One result of these inhibitors of methane is an apparent decrease in gaseous loss of carbon and hydrogen during fermentation and alteration of rumen metabolism as, for example, a shift toward producing more desirable fatty acids for growth especially propionic and butyric acids. These are more readily utilized by the ruminant to increase the efficiency of rumen digestion of feed to give more weight gain on the same or less ingested feed. Details of the supposed mechanism of action and testing procedures are outline in our previous pending applications referred to above.

We have now discovered that certain polyhydric alkanol haloacetaldehyde hemiacetals have extremely good activity, are of unusually low cost, are palatable to the animal, and form acceptable feed and premix compositions.

The active ingredients are represented by the following structural formula:

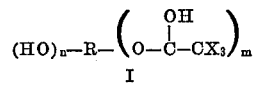

I in which $n$ is an integer of from 0 to 4; $m$ is an integer of from 2–6; X is hydrogen, bromo or chloro at least two of which are bromo or chloro; and R is a straight or branched alkane chain of 2–6 carbon atoms. The sum of $n$ plus $m$ should for practical reasons be no larger than 6.

The preferred compounds are those in which $n$ is 0, $m$ is 3–6, X is chloro and R contains 5–6 carbon atoms. A particularly useful and valuable compound is pentaerythritol tetrachloral hemiacetal.

One skiled in the art will realize that the O-lower acyl or O-lower alkyl derivatives of these compounds can be optionally prepared such as those derived from alkanes of up to 6 carbons. Also the alkane skeleton can be enlarged by optional methylene groups or may be cyclic. None of these or other modifications are particularly advantageous over those described since a high halogen content and low cost of chemical are vital to the commercial aspects of this invention.

The active ingredients of this invention are prepared by the methods described in U.S. Pat. No. 2,784,237. Briefly the known alkanol and the desirable mole equivalent amount of haloacetaldehyde are reacted in an unreactive solvent or preferably no solvent usually at reflux temperature until reaction is complete. In the latter case if the product is a solid, the molten product is then poured onto trays, cooled, and broken up. Other methods of synthesis are detailed in J. Indian Chem. Soc. 13, 118 (1936). Most of the active ingredients of this invention are solid glasses or high boiling viscous liquids. The solid chemicals are preferred since they are easily powdered. The liquid products can be best used as an additive to feed in the form of a premix mixed then used promptly.

In the active chemical ingredient, mixtures of variously substituted alkanols may be used since it is often more economical to run the reaction and not purify the resulting product completely. The exact number of halohemiacetal groups present is immaterial if the chemical composition of the active ingredient is reproducible according to standard analytical procedures. Chlorine content is a most useful analytical tool. In practice the compounds in which all the hydroxyl groups, up to six, are reacted to form hemiacetal derivatives are preferred as the most active and most economical compounds to be used in this invention. However, as is clear above, less than all the available hydroxyl groups may be converted to halohemiacetal derivatives. In practice at least two per molecule of polyhydric alkanol and preferably four to six polyhalohemiacetal groups are present.

Among the more useful compounds to be active ingredients in this invention are mannitol chloral hemiacetal, sorbitol hexachloral hemiacetal, mannitol hexachloral hemiacetal, mannito tetrachlora hemiacetal, glycerol trichloral hemiacetal, glycerol tribromal hemiacetal, propylene glycol dichoral hemiacetal and especially pentaerythritol tetrachloral hemiacetal.

The above derivatives known to the art which are stable nonvolatile solids are of course preferred.

The chemical ingredients are incorporated into feed or feed premix compositions in effective but nontoxic and nontherapeutic quantities which increase feed efficiency. The compositions are then fed to ruminant animals as usual in the agricultural art mostly ad libitum.

The ruminant feeds most generally used in conjunction with the method of this invention are either the roughage feeds such as silage or various commercial grain mixtures commonly used in ruminant animals, that is, in cattle or sheep. The amount of additive used to supplement such feeds will be an amount sufficient to improve the feed efficiency of the animal but not to have a pharmacodynamic or otherwise toxic or noxious effect. For example, in the broad range of about 10 g. to 2 kg. of additive per ton of feed (about 0.001–0.2%) preferably from about 50–600 g./ton. An average sheep will ingest about 3–4 lbs. of feed daily. An average cow about 20–25 lbs. Therefore, the broad range of dosage for ruminants (sheep to cows) is roughly about 50 mg.–7 g. per day.

As a specific preferred example, pentaerythritol tetrachloral hemiacetal (PTH) may be used at the rate of from about 50–500 g./ton of feed for sheep preferably about 200–400 g./ton. In using ingredients having fewer haloacetal groups, i.e., a lower chlorine or bromine content, larger amounts in the range are used, more groups lower amounts. It will be noted that the amount of active ingredient ingested per day per ruminant is much lower than the therapeutic ranges such as the sedative effects noted in Pat. No. 2,784,237 for these compounds.

For commercial use, the active ingredients are most readily used as premix formulations in which the chemical is distributed uniformly throughout a standard animal feed carrier in an amount to give active levels of chemical ingredient at tonnage amounts as described above when diluted to whole feed. This premix or concentrate is mixed with either a normal or a special fattening diet of the ruminant as desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 5–75% by weight of the premix composition depending largely on the physical properties and activity of the active ingredient. If the chemical is a liquid, it may be adsorbed on a carrier such as vermiculite prior to mixing. If the chemical is a solid glasslike material, it usually is powdered using a minimum of heat source.

The animal feeds themselves may also contain cellulosic roughage such as cellulose, hay, straw, corn stalks, cotton seed hulls, oats, barley and cereal brans; natural oils such as animal fats, fish oils, safflower oil, peanut oil and cottonseed oil, antioxidants, minerals, vitamins; antibiotics; anthelmintics; and other appropriate medicaments.

A typical prepared animal feed is as follows:

| | |
|---|---|
| Mixed hay | 40.0%. |
| Ground yellow corn | 45.0%. |
| Soybean oil meal | 7.0%. |
| Cane molasses | 7.0%. |
| Dicalcium phosphate | 0.5%. |
| Trace mineral salt | .5%. |
| Vitamin A | 300 I.U./lb. |
| Vitamin D | 150 I.U./lb. |
| Pentaerythritol tetrachloral hemiaceta (PTH) | 100 g./ton of feed. |

An example of a suitable premix is as follows:

Pentaerythritol tetrachloral hemiacetal (PTH) _ 200 g.
Ground yellow corn _____ To 3 lb.

Another might be a 10% mixture of active ingredient and vermiculite.

In the field the active ingredients may be administered by means of salt or molasses blocks. A typical block may be prepared using the following conditions:

| Ingredient: | Weight percent |
|---|---|
| Dried cane molasses | 44.54 |
| Ground soybean hulls | 24.90 |
| Pentaerythritol tetrachloral hemiacetal (PTH) | 5.00 |
| Granulated salt | 21.59 |
| Trace minerals and vitamins | 0.20 |
| Stabilized animal fat | 1.11 |
| Moisture | 2.66 |

The method of this invention comprises allowing the cattle or sheep to graze or be fed ad libitum on the supplemented rations or to be hand fed on a regular schedule.

Normally we have found feed efficiency increases of from about 10–15% using normal fattening diets and conditions.

The ability of the polyhydric alkanol polyhalohemiacetal derivatives of this invention to improve feed utilization in ruminants is primarily evaluated by means of a test which measures in vitro methane gas production plus total gas production as an indicator of the rate of fermentation of feedstuffs by microorganisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3 hours. Test compound may be added as such or, particularly when used in quantities as small as 10 p.p.m. or less, suspended or dissolved in a solvent such as water or ethanol. At the end of the test period, the trapped gases are sampled by hypodermic needle from the flask and run through a gas partitioner (column chromatography) which separates and quantitates the components. The liquids (volatile fatty acids, etc.) are analyzed by gas liquid chromatography. Among the products measured are carbon dioxide, lactic acid, ethanol, hydrogen, ammonia nitrogen and fatty acids having from 2 to 6 carbon atoms. Reduction in the percent methane produced of 20% is considered significant. However, with compounds used in the present invention, reduction of 90–100% without reduction of overall fermentation is not uncommon. Ability of a particular compound to reduce the amount of methane generated without adversely reducing the overall rate of fermentation is determined by comparing the total ($\mu$moles/ml.) volatile fatty acids produced in control systems with those containing test compound. Also most significant is the distribution of fatty acids obtained.

The effect of the polyhydric alkanol polyhaloacetal derivatives of this invention in reducing methane production without causing a reduction in the rate of overall fermentation at effective concentrations, when tested by the above procedures, is shown by the data below.

A predetermined molar or percent concentration of test compound in water or ethanol was administered usually in 0.1, 0.5 or 1.0 cc. portions as described above. The data in Table I is, for parts of active ingredient per amount of rumen fluid, i.e., parts per million with resulting significant methane inhibition. Generally speaking, 100 p.p.m. equals 0.01% of diet or 90.8 g./ton of feed.

TABLE I

| Compound | P.p.m. | Percent methane reduction |
|---|---|---|
| Glycerol trichloral hemiacetal | 12 | 95 |
| | 24 | 95 |
| | 48 | 100 |
| 1,2-propylene glycol dichloral hemiacetal | 5 | 80 |
| | 25 | 100 |
| | 50 | 100 |
| Mannitol hexachloral hemiacetal | 5 | 100 |
| | 25 | 100 |
| | 50 | 100 |
| Pentaerythritol tetrachloral hemiacetal | 5 | 65 |
| | 20 | 95 |
| | 35 | 100 |

The results of in vitro tests which correlate methane inhibition with a desired shift in ratio of fatty acid production in the rumen to the more efficiently utilized acids especially propionate is presented in Table II. This represents the analysis of rumen content evaluated statistically which results from the substantially complete inhibition of rumen methanogenesis by the derivatives noted above which is achievable using this invention.

TABLE II

| | Molar percent | |
|---|---|---|
| | Controls | Treated |
| $C_2$ fatty acids | 54 to 57 | 50 to 52. |
| $C_3$ fatty acids | 21 to 23 | 25 to 28. |
| $C_4$ fatty acids | 15 to 18 | 19 to 22. |
| $C_5$ or higher fatty acids | Remainder to 100% | Remainder to 100%. |
| Total $\mu$ moles/ml | 68 to 72 | 67 to 74. |

The in vitro data presented above was confirmed by specific in vivo tests as follows:

Each dose level represents a test group of four head of pinhole fistulated sheep. The animals were fed the additive (PTH) mixed with morning and evening feed in quantities so that 90% ad libitum amounts were administered. The sheep would eat all the supplemented feed in one hour. The results ran for a 7-day period.

Samples were withdrawn from the rumen 4–5 hours after the morning feeding and again 15–18 hours after the evening feeding. The ration was all roughage ration.

Analysis of the samples by gas partitioner and G.L.C. for gas and fatty acid content were carried out.

TABLE III

Gas Analysis (Corrected)
[PTH mixed in feed at 500 p.p.m.]

|  | $CO_2$ | $CH_4$ | $H_2$ |
|---|---|---|---|
| Control | 69.0 | 30.5 | 0.5 |
| Treated | 70.5 | 2.5 | 27.0 |

Volatile Fatty Acid Analysis
[PTH mixed in feed at 500 p.p.m.]

|  | Control | Treated |
|---|---|---|
| Component: | | |
| Acetate, $C_2$ | 76 | 58 |
| Propionate, $C_3$ | 16 | 27 |
| Butyrate, $C_4$ | 7 | 12 |
| Valerate>, $C_5$ | 1 | 3 |
| Total $\mu$moles/ml | 48 | 50 |

As expected, the ratio of $C_2/C_3+C_4$ narrows (decreases) from 3.30 for control to 1.49 for treated group.

This data in sheep using pentaerythritol tetrachloral acetal confirms the in vitro results present.

The in vivo results above were confirmed by actually sampling the methanogenesis inhibition in 5 randomly chosen sheep in the feeding trials described hereafter:

At 400 g./ton of pentaerythritol tetrachloral hemiacetal (PTH):

|  | Animal No. | Percent methane |
|---|---|---|
| Control | 1 | 29.8 |
| Do | 9 | 27.3 |
| Do | 10 | 32.2 |
| Do | 12 | 32.1 |
| Do | 17 | 34.2 |
| P.T.H. | 130 | 13.5 |
| P.T.H. | 136 | 5.0 |
| P.T.H. | 149 | 2.1 |
| P.T.H. | 219 | 18.5 |
| P.T.H. | 224 | 9.4 |

Feeding trials using various dose levels of pentaerythritol tetrachloral hemiacetal were carried out on West Texas feeder lambs under feedlot conditions. The control consisted of three pens of 10 lambs each. The treated lambs also consisted of three pens of 10 lambs each at each dose level. The data presented is cumulative after 60 days treatment. The experimental ration used was:

|  | Percent w./w. |
|---|---|
| Mixed ground hay 13% | 40.0. |
| Ground corn | 44.0. |
| Soybean meal 44% | 7.0. |
| Dried molasses 87% | 8.0. |
| Dicalcium phosphate | 0.5. |
| Trace minerals | 0.5. |
| Vitamin A 30,000 units/gm. | 20 g./ton. |
| Vitamin $D_2$ 16,000,000 units/gm. | 8.5 g./ton. |

The following results were obtained:

|  | Average net feed consumed | Average wt. gain | Average food/gain |
|---|---|---|---|
| Controls | 736.40 | 87.63 | 8.4417 |
| 100 g./ton | 770.96 | 93.83 | 8.2251 |
| 200 g./ton | 730.50 | 93.07 | 7.8634 |
| 400 g./ton | 705.59 | 88.30 | 8.0253 |

It will be seen that the best results are obtained with the 200 g./ton level of P.T.H.

The disclosure above describes the nub of the invention claimed so that one skilled in the art can practice the invention. Other variations which do not add to the advantages noted hereabove may be obvious to those skilled in the art.

We claim:
1. The method for improving the feed utilization of ruminant animals comprising administering orally to such animals an effective but nontoxic and nontherapeutic quantity of an active ingredient comprised of a polyhydric alkanol haloacetaldehyde hemiacetal derivative of the formula:

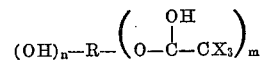

in which:
  $n$ is an integer of from 0–4;
  $m$ is an integer of from 2–6;
  X is hydrogen, bromo or chloro at least two of which are bromo or chloro; and
  R is a straight or branched alkane chain of 2–6 carbon atoms, the sum of $n$ plus $m$ being a maximum of 6, said quantity being from the daily dosage of about 50 mg. –7 g. per ruminant animal.

2. The method of claim 1 in which $n$ is 0, $m$ is 3–6, and X is chloro or bromo.

3. The method of claim 1 in which the quantity of polyhydric alkanol haloacetaldehyde hemiacetal is from about 10 g. to about 2 kg. per ton of feed.

4. The method of claim 1 in which the quantity of active ingredient is from about 50–600 g. per ton of feed.

5. The method of claim 1 in which the quantity of active ingredient is about 200 g. per ton of feed.

6. The method of claim 1 in which the active ingredient is pentaerythritol tetrachloral hemiacetal.

7. The method of claim 6 in which the active ingredient is present in the feed at the rate of about 100–400 g./ton of feed.

8. The method of claim 6 in which the active ingredient is present in the feed at the rate of about 200 g./ton of feed.

9. An animal feed supplemented by the quantity of polyhydric alkanol haloacetaldehyde hemiacetal derivative of claim 1.

10. An animal feed supplemented by the quantity of polyhydric alkanol haloacetaldehyde hemiacetal derivative of claim 3.

11. An animal feed supplemented by the quantity of polyhydric alkanol haloacetaldehyde hemiacetal derivative of claim 4.

12. An animal feed supplemented by the quantity of polyhydric alkanol haloacetaldehyde hemiacetal derivative of claim 6.

13. A premix feed containing the quantity of polyhydric alkanol haloacetaldehyde hemiacetal derivative of claim 1 dispersed in an edible animal carrier feed.

14. A premix feed containing the quantity of polyhydric alkanol haloacetaldehyde hemiacetal derivative of claim 3 dispersed in an edible animal carrier feed.

15. A premix feed containing the quantity of polyhydric alkanol haloacetaldehyde hemiacetal derivative of claim 4 dispersed in an edible animal carrier feed.

16. A premix feed containing the quantity of polyhydric alkanol haloacetaldehyde hemiacetal derivative of claim 6 dispersed in an edible animal carrier feed.

References Cited
UNITED STATES PATENTS
2,784,237   3/1957   Bruce _____ 260—615 A OTHER REFERENCES
Journal of Dairy Science, vol. 51, No. 6, pp. 882–887, 1968, Prins et al.
Journal of Bacteriology, vol. 94, No. 1, pp. 171–175, July 1967, Bauchop, T.

NORMAN YUDKOFF, Primary Examiner
K. P. VAN WYCK, Assistant Examiner

U.S. Cl. X.R.
99—2 R